March 13, 1945. H. JAFFA 2,371,241
PROTECTION DEVICE
Filed April 8, 1943
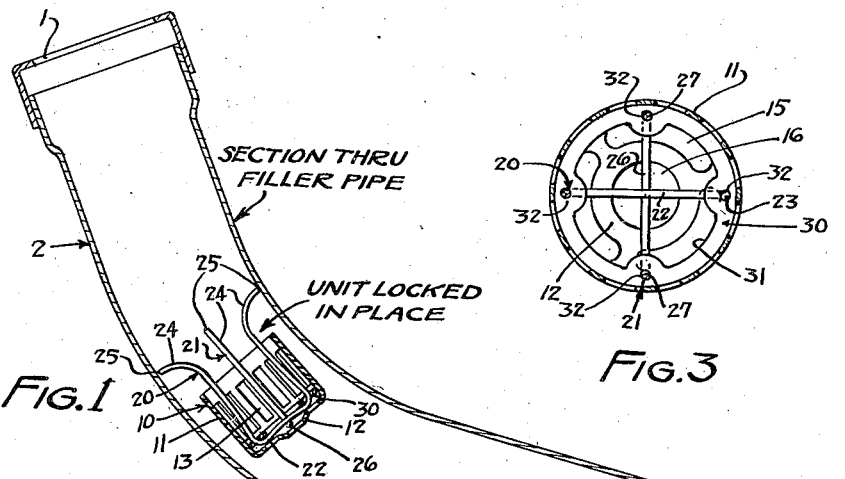
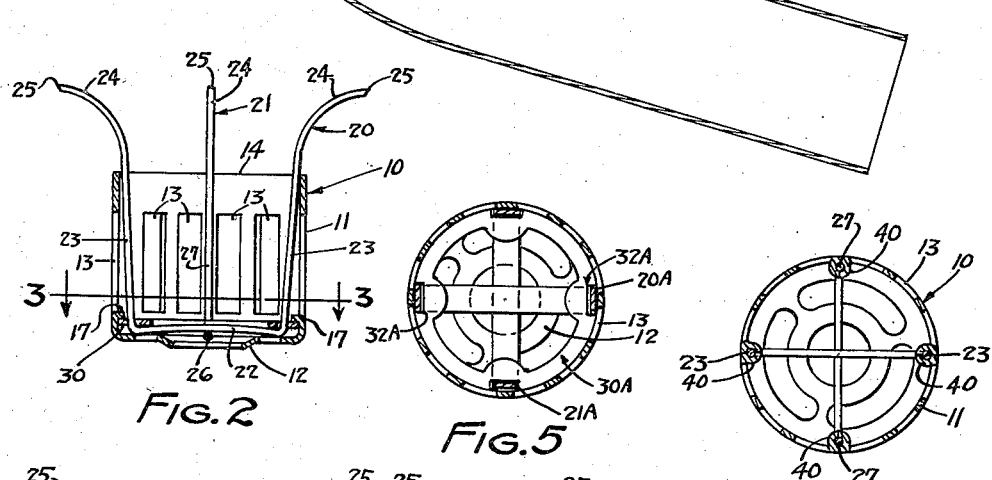
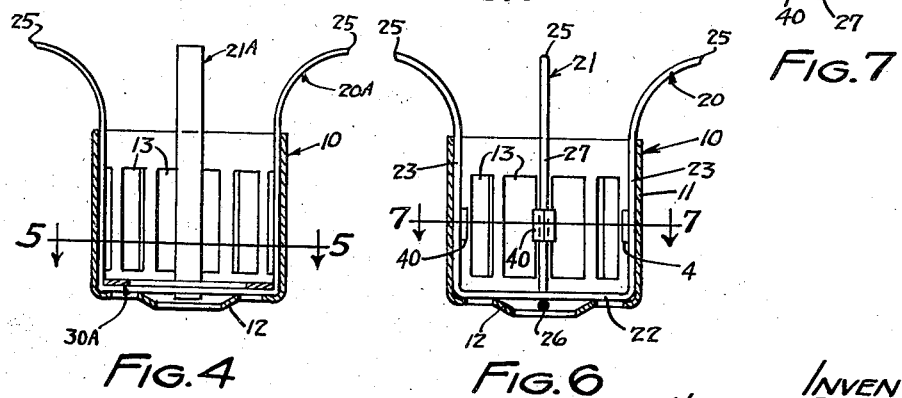
INVENTOR
HARRY JAFFA
By Paul, Paul & Moore
ATTORNEYS Patented Mar. 13, 1945

2,371,241

UNITED STATES PATENT OFFICE 2,371,241

PROTECTION DEVICE

Harry Jaffa, Minneapolis, Minn.

Application April 8, 1943, Serial No. 482,329

4 Claims. (Cl. 220—86)

This invention relates to an article of manufacture which is adapted to be used for preventing removal of liquids from tanks equipped with a filler pipe. Automotive vehicles are normally equipped with a filler pipe extending from a location outside of the vehicle to a concealed gasoline tank. The theft of gasoline from such automotive vehicle tanks can easily be accomplished by siphoning off gasoline through the filler pipe by inserting a rubber tube therein.

It is an object of the present invention to provide an apparatus capable of being easily inserted into such a filler pipe of a tank so as to prevent the insertion of a siphoning hose through the filler pipe, but without, at the same time, obstructing the normal inflow of gasoline or other fuel through the filler pipe.

It is also an object of the invention to provide a device which may be readily inserted with simple tools but which locks into place so as to resist removal.

Other and further objects of the invention include the provision of a simple convenient article of manufacture capable of performing the useful service.

Other and further objects of the invention are those inherent in and implied by the apparatus illustrated, described and claimed.

The invention is illustrated with reference to the drawing in which

Figure 1 is a sectional view of a filler pipe showing the apparatus of the invention in place therein;

Figure 2 is an enlarged sectional view in elevation further illustrating the apparatus;

Figure 3 is a sectional view along the lines 3—3 of Figure 2;

Figure 4 is a sectional view in elevation of a modified form of the invention;

Figure 5 is a sectional view along lines 5—5 of Figure 4;

Figure 6 is a sectional view in elevation showing a further modified form of the invention, and Figure 7 is a sectional view along the lines 7—7 of Figure 6.

Referring to Figures 1, 2 and 3, the apparatus consists of a thimble, generally designated 10, of metal or other suitable material such as plastic material. The thimble is preferably, though not necessarily, cylindrical in shape having sidewalls 11 and a bottom wall 12. The sidewalls 11 are perforated by means of rectangular or other shaped apertures 13 and the bottom is provided with arcuate circumferential apertures 15 and a center aperture 16.

Within the thimble, there are positioned two generally U-shaped wires 20 and 21, which are substantially identical in shape. Wire 20 is continuous and has a bottom portion 22 and portions 23 which extend longitudinally of the thimble from the closed end 12 to the open end 14. The portions 23 of the wires extend beyond the open end 14 and are curved outwardly at 24. The curved ends of the wire are preferably clipped so as to provide a sharp edge 25. The portion 22 of the wire 20 extends across the base of the thimble, preferably diametrically or as a chord. The wire 21 is preferably the same shape as wire 20 and has a portion 26 extending across the base 12 of the thimble crosswise of the portion 22. The two wires 20 and 21 are resilient and normally assume the position shown in Figure 2, in which position they bear outwardly against the upper edge 14 of the thimble. The wires 20 and 21 are of hard springy metal and are assembled into a washer, generally designated 30. The washer 30 has a large circumferential opening 31 and is punched out at 32 so as to permit the portions 23—23 of the wire 20 and similar portions 27 of the wire 21 to pass therethrough. The upper curves 24 of the wire 20 and the similar curves of the wire 21 are bent into the wires after assembling onto the washer 30. The wire and washer assembly is then pushed into the thimble 10 until the crosswires 22—26 are in engagement with the bottom 12 of the thimble, and a portion of the metal of the sidewall 11 of the thimble is bent down as shown at 17 so as to hold the washer in place.

In use, the assembled article of manufacture is inserted through the opening 1 of a filler pipe, generally designated 2. Upon insertion, the wires are pushed radially inwardly and tips 25 of the wires engage the inner surface of the filler pipe, with the result that the entire spring force of the wires is concentrated upon the tips 25 engaging the inner surface of the filler pipe. The sharp tips 25—25 tend to bite into the metal of the filler pipe and consequently lock the unit in place. The unit is pushed into the filler pipe by means of a broom stick or hammer handle until it is sufficiently far down in the filler pipe to be out of the reach of common tools such as pliers. It is frequently convenient to insert the unit and force it out of reach into the bend on the filler pipe and beyond the bend by means of a curved tool. In this way, the unit is entirely out of reach and successfully frustrates theft of fuel from the tank.

It may be noted that the tips 25 of the wires are clipped off so as to provide a slanting surface in the direction of insertion, and the point therefore tends to dig into the inner wall of the filler pipe if any attempt is made to withdraw the unit.

In the apparatus shown in Figures 4 and 5, the wires, generally designated 20A and 21A, are of flat steel spring stock, and washer 30A, instead of being punched to receive the flat stock, is merely notched out as shown at 32A. The washer 30A is made of a size such that it must be pressed into the inside of the thimble 10 and cannot be removed except by the use of excessive force. The washer 30 may, if desired, be locked in place by spotwelding or by crimping as shown at 17 in Figure 2.

In Figures 6 and 7, there is illustrated a further modification of the invention wherein the wires, generally designated 20 and 21, are held in place by means of crimps 40, formed by curving the metal from the sidewall 11 of the thimble 10 around the portions 23 and 27 of the wires. By this mode of fastening, the portions 23 and 27 of the wires are held closely adjacent the sidewall 11 of the thimble and the springy action is very pronounced thus holding the tips 25 of the wires into hard contact with the inside of the filler pipe.

In each of these forms of the invention herein shown, the thimble establishes the outer diameter positions of the wires 20 and 21 in the relaxed portion and thus permits accurate assembly. This is a convenience in respect to insertion of the device in filler pipes of automobiles. At the same time, the thimble serves to prevent tipping of the wires but allows free radial movement so as to enable the wires to lock the device in place, during use.

Many obvious variations will be apparent to those skilled in the art and such are intended to be within purview of the invention illustrated, described and claimed.

I claim as my invention:

1. An article of manufacture comprising a relatively large thimble having sidewalls and an enclosed base, said thimble being perforated, a washer having perforations therein fitted to nest into the thimble against the base, a plurality of wires fastened to the washer extending across the washer, said wires being bent to extend along the inner wall of the thimble toward the open end thereof, said wires extending beyond the open end of the thimble a distance less than twice the axial length of the thimble, the extending ends being bent outwardly and terminated in a circle, the diameter of which is less than twice the diameter of the thimble when the device is in use, said washer being crimped into the thimble over the wires to hold the latter in assembled relation.

2. A device of the type set forth in claim 1 further characterized in that the wires are round stock and pass through holes in the washer for retention thereto.

3. A device of the type set forth in claim 1 further characterized in that the wires are flat stock, positioned to lie against the inner surface of the thimble when in relaxed position.

4. An article of manufacture comprising a relatively large thimble having an enclosing sidewall and bottom, said sidewall and bottom being perforated, wires shaped to extend across the bottom and then longitudinally along opposite portions of the inside of the sidewall, said longitudinal portions of said wires being extended beyond the sidewall a distance less than twice the axial length of the thimble and curved outwardly, said wires being attached to the thimble adjacent the bottom thereof by means of a superimposed washer which is in turn fastened to the thimble, the ends of said wires being terminated in a circle, the diameter of which is less than twice the diameter of the thimble when the device is in place in a pipe.

HARRY JAFFA.